United States Patent
Koma et al.

(10) Patent No.: US 6,362,864 B2
(45) Date of Patent: *Mar. 26, 2002

(54) VERTICAL ALIGNMENT LIQUID CRYSTAL DISPLAY DEVICE HAVING PLANARIZED SUBSTRATE SURFACE

(75) Inventors: Norio Koma; Kiyoshi Yoneda; Tetsuji Omura, all of Gifu (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/780,816

(22) Filed: Feb. 9, 2001

Related U.S. Application Data

(62) Division of application No. 09/193,665, filed on Nov. 17, 1998, now Pat. No. 6,204,905.

(30) Foreign Application Priority Data

Nov. 18, 1997 (JP) ............................................. 9-317169

(51) Int. Cl.[7] ..................... G02F 1/1333; G02F 1/1337; C09K 19/02
(52) U.S. Cl. ..................... 349/138; 349/123; 349/124; 349/178
(58) Field of Search .............................. 349/123, 124, 349/134, 138, 143, 110, 178

(56) References Cited

U.S. PATENT DOCUMENTS

| | | | |
|---|---|---|---|
| 5,051,570 A | 9/1991 | Tsujikawa et al. ........ 250/201.1 |
| 5,084,905 A | 1/1992 | Sasaki et al. ................. 357/71 |
| 5,307,189 A | 4/1994 | Nishiki et al. ................ 359/59 |
| 5,309,264 A | 5/1994 | Lien et al. ..................... 359/87 |
| 5,585,951 A | 12/1996 | Noda et al. .................. 349/122 |
| 5,612,799 A | 3/1997 | Yamazaki et al. ............. 349/42 |
| 5,618,592 A | 4/1997 | Nagae et al. ................... 428/1 |
| 5,629,786 A | 5/1997 | Ogura et al. ................. 349/123 |
| 5,666,179 A | 9/1997 | Koma ........................ 349/143 |
| 5,706,064 A | 1/1998 | Fukunaga et al. ............. 349/43 |
| 5,708,485 A | 1/1998 | Sato et al. ..................... 349/42 |
| 5,719,647 A | 2/1998 | Fujikawa et al. .............. 349/40 |
| 5,726,721 A | 3/1998 | Sumiyoshi et al. ............ 349/54 |
| 5,757,455 A | 5/1998 | Sugiyama et al. ........... 349/129 |
| 5,760,861 A | 6/1998 | Kim ............................ 349/110 |
| 5,767,827 A | 6/1998 | Kobayashi et al. ............ 345/87 |
| 5,784,132 A | 7/1998 | Hashimoto .................... 349/44 |
| 5,831,704 A | 11/1998 | Yamada et al. .............. 349/124 |
| 5,844,538 A | 12/1998 | Shiraki et al. ................. 345/98 |
| 5,870,157 A | 2/1999 | Shimada et al. ............. 349/106 |
| 5,877,832 A | 3/1999 | Shimada ...................... 346/138 |
| 5,956,105 A | 9/1999 | Yamazaki et al. ............. 349/43 |
| 5,990,491 A | 11/1999 | Zhang ........................... 257/57 |

FOREIGN PATENT DOCUMENTS

| | | | | |
|---|---|---|---|---|
| JP | 61141174 | 6/1986 | ........... H01L/27/14 |
| JP | 1156725 | 6/1989 | ........... G02F/1/133 |
| JP | 2234134 | 9/1990 | ........... G02F/1/136 |

Primary Examiner—William L. Sikes
Assistant Examiner—Tarifur R. Chowdhury
(74) Attorney, Agent, or Firm—Hogan & Hartson

(57) ABSTRACT

A pixel electrode for driving liquid crystal is formed on a planarization insulator film covering a thin film transistor, and a vertical alignment film without rubbing treatment is formed on the pixel electrode. An alignment control window that has electrode-free portion is formed in a common electrode, and a vertical alignment film is formed on the common electrode without rubbing treatment. The liquid crystal having negative dielectric constant anisotropy is controlled in an initial direction of the substantially normal direction without pretilt. Upon applying a voltage, the tilt of the alignment is controlled in the direction of a slanting electric field at the edge of the pixel electrode and the edge of the alignment control window, so that pixel division is performed. Since rubbing treatment is not performed, electrostatic breakdown of the thin film transistor is prevented and, because a black matrix is eliminated, aperture ratio is improved.

15 Claims, 14 Drawing Sheets

VERTICAL ALIGNMENT LIQUID CRYSTAL DISPLAY DEVICE HAVING PLANARIZED SUBSTRATE SURFACE

This is a division of application Ser. No. 09/193,665 filed Nov. 17, 1998, now U.S. Pat. No. 6,204,905 which application is hereby incorporated by reference in its entirety.

BACKGROUND OF THE INVENTION

1. Field of the Invention

The present invention relates to a vertically alignment liquid crystal display (LCD).

2. Description of the Related Art

Flat panel displays such as LCD, organic electroluminescence (EL), or plasma displays have been enthusiastically developed and commercialized in recent years. Particularly, LCDs has become a main display for office automation (OA) devices and audio visual (AV) devices because LCDs have attractive features such as thin and low power consumption. Especially, active matrix LCDs having thin film transistors (TFTS) as switching elements for controlling a timing to rewrite pixel data into each pixel enable a wide screen and animation display with a high resolution, and have become widely used in various television sets, personal computers, mobile computers, and monitors for digital still and video cameras.

A TFT is a kind of field effect transistor (FET) made of metal and semiconductor layers formed in a predetermined pattern on an insulated substrate. In an active matrix LCD, each TFT is connected to a corresponding capacitor for driving the liquid crystal disposed between a pair of substrates; the capacitor is constructed between the substrates.

FIG. 1 is an enlarged plan view of a display pixel portion of an LCD, and FIG. 2 is a cross section of the LCD along B—B line shown in FIG. 1. On the substrate 50 a gate electrode 51 is formed that is made of Cr, Ti, Ta, or another suitable metal, over which a gate insulating film 52 is formed. On the gate insulating film 52 an amorphous silicon, i.e., a-Si film 53 is formed in an island shape so as to cross over the gate electrode 51. On the a-Si film 53 an N$^+$ a-Si film 53N is formed, each end of which is doped with impurities so as to make an ohmic layer. Above the channel region of the a-Si film 53, an etch stopper 54 is remained. On the N$^+$ a-Si film 53N a drain electrode 56 and a source electrode 57 are formed, over which an interlayer insulating film 58 is formed. On the interlayer insulating film 58 a pixel electrode 59 that is made of indium tin oxide (ITO) or Al is formed, which is connected to the source electrode 57 via a contact hole formed in the interlayer insulating film 58. On the pixel electrode 59 an alignment film 71 made of polyimide or the like is formed, and is processed by rubbing treatment as shown in FIG. 3. In this way, the TFT substrate is manufactured.

On another substrate 60 facing the TFT substrate 50, red (R), green (G), and blue (B) color filters 61 are formed, each of which is made of a film resist and is disposed at a position corresponding to each pixel electrode 59. In addition, a black matrix 61BM which is made of a light shielding film resist is formed at a position corresponding to a gap between the pixel electrodes 59 and at a position corresponding to the TFT. On the layers of these color filters 61 and the black matrix, a common electrode 62 made of ITO is formed. On the common electrode 62 an alignment film 72 is formed and is processed by rubbing treatment in the same way as on the substrate 50. In this way, the opposing substrate is manufactured.

Between the TFT substrate 50 and the opposing substrate 60, a liquid crystal layer 80 is disposed. The orientation, i.e., the alignment of the liquid crystal molecules 81 is controlled in accordance with an intensity of an electric field formed by a voltage applied between the pixel electrodes 59 and the common electrode 62. Outsides of the substrates 50 and 60 polarizing films (not shown) with perpendicular polarizing axes are provided. Linear polarized light passing through these polarizing films is modulated when passing through the liquid crystal layer 80 that is controlled in different alignments per each display pixel, and is thereby controlled in a desired transmittance.

In the above-mentioned example, the liquid crystal has a negative dielectric constant anisotropy. The alignment films 71 and 72 are vertical alignment films that control the initial direction of the liquid crystal in the direction perpendicular to the substrate. In this case, when a voltage is not applied, the linear polarized light that passed through one of the polarizing films is blocked by the other polarizing films after passing through the liquid crystal layer 80 so that the display is recognized as black. When the voltage is applied, the linear polarized light that passed through one of the polarizing films is double refracted by the liquid crystal layer 80 to become an elliptically polarized light, which passes the other polarizing films so that the display is recognized as nearly white. This type is called a normally black (NB) mode. Particularly, the vertical alignment films 71 and 72 are processed by the rubbing treatment, so that the initial orientations of the liquid crystal molecules 81 are aligned in the direction with a slight pretilt from the normal direction. This pretilt angle $\theta$ is normally set to more than one degree, but equal to or less than five degrees. The liquid crystal molecule 81 is electrically uniaxial. The angle between the axial direction and the direction of the electric field is determined by the electric field strength, while the azimuth with respect to the direction of the electric field is not controlled. The liquid crystal molecule 81 having the negative dielectric constant anisotropy tilts in a direction different from the electric field direction. However, by providing pretilt, an applied voltage can make the liquid crystal molecule 81 tilt toward the pretilt direction. Therefore, the tilt directions are aligned so that a variation of alignments of the liquid crystal in a plane can be suppressed and deterioration of the display quality can be prevented.

The black matrix 61BM is provided for preventing a drop of the contrast ratio due to undesired light that is emitted from the display by the birefringence of the liquid crystal with the pretilt and passes through the liquid crystal layer 80 in a region in which the voltage is not applied between the display pixels.

FIGS. 4A–4E show a method for manufacturing the opposing substrate. First, in the step shown in FIG. 4A, the R, G and B color filters 61R, 61G and 61B are formed on the substrate 60. In order to form the R color filter 61R, an R film resist is affixed, which is then exposed and developed in the shape corresponding to the R display pixels. The G color filter 61G and the B color filter 61B are formed in a similar manner. These color filters 61R, 61G, and 61B are formed in dimensions slightly smaller than those of the corresponding display pixels 59 shown in FIG. 2.

In the next step shown in FIG. 4B, a light shielding film resist 61BM' is affixed, and is followed by the step shown in FIG. 4C, in which the film resist is exposed and developed in the shape corresponding to the gap between the pixels so that the black matrix 61BM is formed among the color filters 61R, 61G and 61B. This black matrix 61BM is formed in a dimension larger than the gap between the pixel electrodes 59 shown in FIG. 2.

In the next step shown in FIG. 4D, the ITO film is formed so as to produce the common electrode 62. In addition, in the step shown in FIG. 4E, a polyimide film is formed by a printing method. Then, the polyimide film is dried by baking, and processed by rubbing treatment. The film is rubbed in the arrow direction with a cloth so as to make the alignment film 72 for giving the pretilt to the liquid crystal.

The liquid crystal having a negative dielectric constant anisotropy changes the alignment of its molecules upon the electric field in such a way that the alignment becomes perpendicular to the direction of the electric field. On this occasion, the liquid crystal generates an action opposing the generated electric field. Generally, however, such a change of the orientation from the vertical alignment of the liquid crystal is not stable compared with a liquid crystal having a positive dielectric constant anisotropy such as a twist nematic (TN) liquid crystal changes from the horizontal alignment. Especially, unevenness of the alignment film 71 and 72 at the interface with the liquid crystal layer 80 due to a step of the TFT or the color filter influences the alignment change of the liquid crystal molecules 81, resulting in a deteriorated display quality.

Furthermore, as shown in FIGS. 3 and 4E, the related art uses a rubbing treatment for the vertical alignment film 71 and 72 in order to give the pretilt θ to the initial orientation of the liquid crystal as shown in FIG. 2. Therefore, when the voltage is applied, all the liquid crystal molecules 81 tilt in the direction of the pretilt (rightward in FIG. 2). Accordingly, the tilt angle of the liquid crystal molecule 81 with respect to the optical path when viewing the LCD from upper right in FIG. 2 is different from that when viewing the LCD from upper left, resulting different transmittances. Thus, there is a problem that a brightness or a contrast ratio changes in accordance with a viewing direction. This is called viewing angle dependence.

Furthermore, since the black matrix 61BM formed on the opposing substrate 60 side should cover the gap region between the pixel electrodes completely, it is formed larger in consideration of position shift when the black matrix 61BM is affixed to the TFT substrate 50 side. For this reason, effective display area decreases and aperture ratio decreases.

In addition, rubbing treatment for making the vertical alignment film 71 of the TFT substrate side may cause an electrostatic breakdown of the TFT, which results in defective display or decline of yield in production of LCDS.

SUMMARY OF THE INVENTION

An object of the present invention is to solve the above-mentioned problems. The liquid crystal display according to the present invention includes first and second substrates whose opposing surface are provided with electrodes for driving the liquid crystal and an alignment film for the liquid crystal, and the liquid crystal disposed between the first and second substrates. The alignment film is a vertical alignment film that controls the liquid crystal in the vertical alignment. The liquid crystal has negative dielectric constant anisotropy, and initial direction of the liquid crystal is substantially in the normal direction of the substrate. The first and/or second substrates have a planarization surface.

With the above structure, when the liquid crystal having the negative dielectric constant anisotropy changes from vertical alignment, the change is performed uniformly and in a good condition.

In another aspect, a liquid crystal display in accordance with the present invention includes first and second substrates facing each other, liquid crystal disposed between the first and second substrates, and a polarizing film provided to the outer surface of the first and/or the second substrates so that the liquid crystal modulates polarized light that passed through the polarization plate for display. The liquid crystal display further includes a plurality of thin film transistors disposed in matrix on the surface of the first substrate facing the second substrate and electrode wires thereof, an insulating film having a planarization surface for covering the thin film transistors and the electrode wires thereof, a pixel electrode for driving the liquid crystal that is formed on the insulating film and is connected to the thin film transistor via a opening formed in the insulating film, a vertical alignment film formed on the pixel electrodes, a common electrode for driving the liquid crystal formed on the surface of the second substrate facing the first substrate, an alignment control window that is electrode-free portion formed in the area of the common electrode facing the pixel electrode, and a vertical alignment film formed on the common electrode. The liquid crystal has negative dielectric constant anisotropy, and initial direction of the liquid crystal is within one degree from the normal direction of the substrates.

With the above-mentioned structure, the alignment of the liquid crystal is controlled towards an appropriate tilt direction in a slanting electric field generated at the edge portion of the pixel electrode and in no electric field area that is the alignment control window. Thus, the pixel division is performed so that viewing angle dependence is reduced.

Preferably, the vertical alignment film is not processed by rubbing treatment.

Since the initial direction of the liquid crystal is controlled within one degree from the normal direction of the substrates, the alignment control of the liquid crystal by the electric field at the edge portion of the pixel electrode and in the alignment control window is performed in good condition without any disturbance.

Preferably, the second substrate is transparent in at least the region corresponding to the pixel electrode and the region corresponding to the gap between the pixel electrodes, and at least a part of the region corresponding to the gap between the pixel electrodes can be shielded from light by the liquid crystal and the polarizing film.

With this structure, a light shielding film is not required to be larger than the gap between the pixel electrodes considering a possible position shift in affixing the first substrate to the second substrate. Accordingly, the effective display area and aperture ratio is increased.

Preferably, the insulating film has a thickness equal to or more than one micrometer.

In this way, the alignment of the liquid crystal by the electric field at the edge portion of the pixel electrode and in the alignment control window is prevented from disturbance by the electric field of the thin film transistor and its electrode wire, so that good pixel division can be performed.

As explained above, in the present invention, good pixel division is performed by controlling the electric field, the viewing angle dependence is reduced, and display quality is improved. In addition, since the rubbing treatment is not performed, production cost is reduced, electrostatic generation is prevented, and yield in production is improved. Furthermore, the aperture ratio is increased since a light shielding mask film is not needed.

DESCRIPTION OF THE PREFERRED EMBODIMENT

Figure 5:
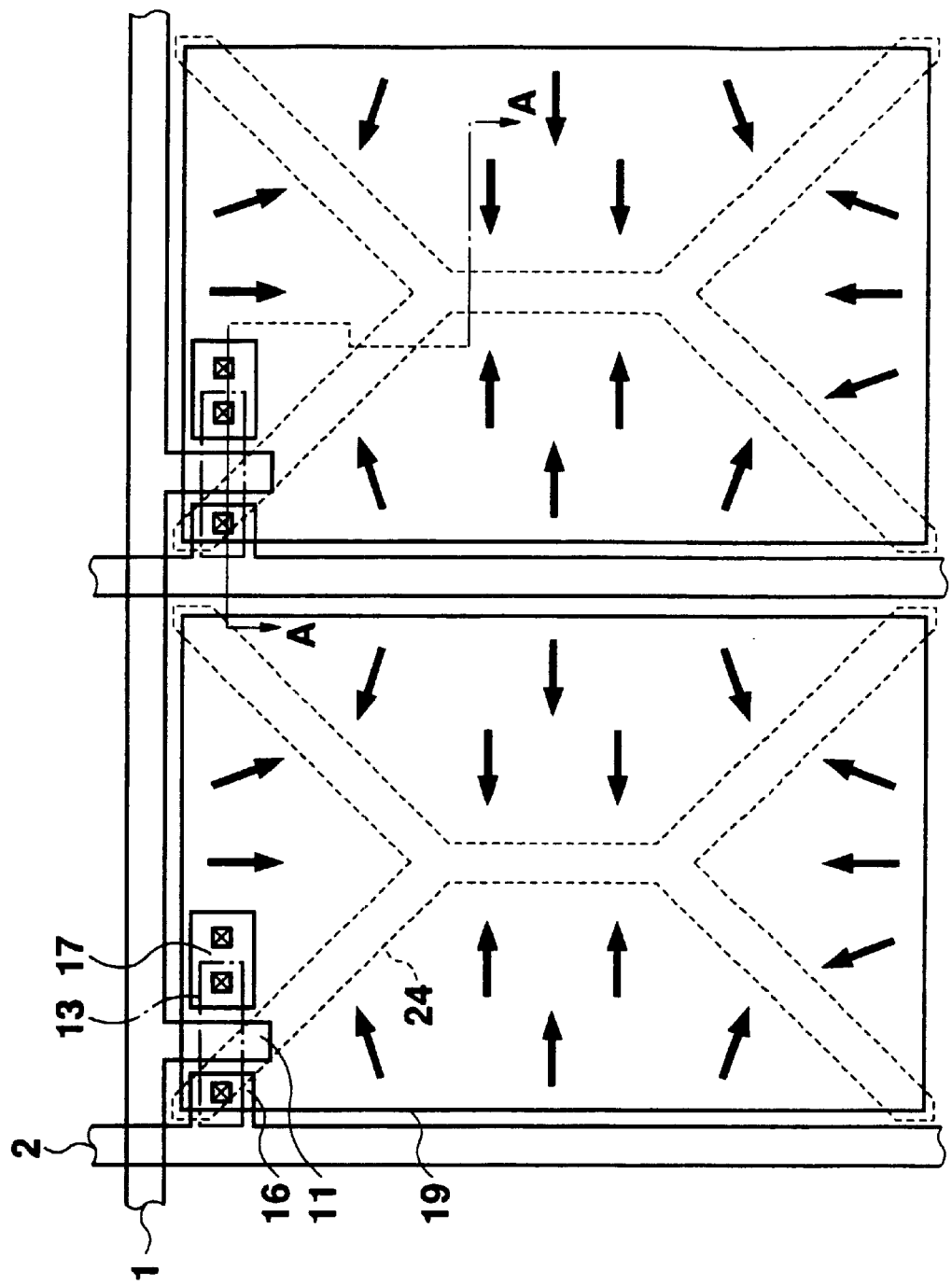
FIG. 5 is a plan view of a liquid crystal display in accordance with an embodiment of the present invention.
Figure 6:
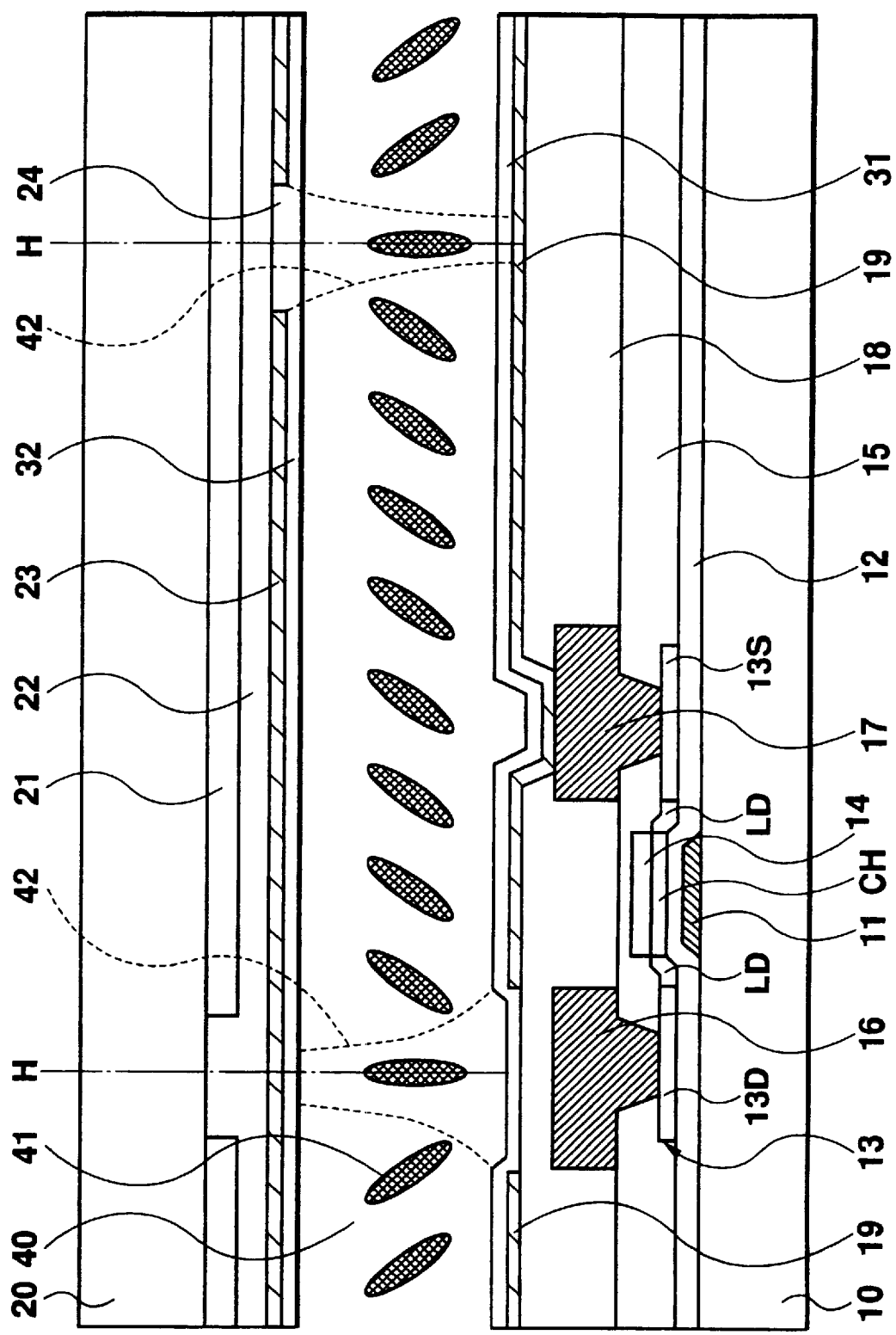
FIG. 6 is a cross section along A—A line of the liquid crystal display shown in FIG. 5.

FIG. 5 is a plan view of a display pixel portion of the LCD in accordance with a preferred embodiment of the present invention, and FIG. 6 is a cross section along A—A line shown in FIG. 5. On a substrate 10, a gate electrode 11 that is made of Cr, Ti, Ta, or another suitable metal is formed, over which a gate insulating film 12 is then formed. On the gate insulating film 12 a P-Si film 13 is formed in an island shape so as to cross over the gate electrode 11. The p-Si film 13 has a non-doped channel region CH directly above the gate electrode 11, lightly doped regions LD in which a N type impurity such as phosphor at low concentration at both sides of the channel region CH, a source region 13S, and a drain region 13D in which the same impurity is doped at high concentration at outer sides of the lightly doped regions LD so as to form an LDD structure.

On the channel region CH, a doping stopper 14 used as a mask in ion doping process is remained. Over the p-Si film 13 an interlayer insulating film 15 is formed, on which a drain electrode 16 and a source electrode 17 are formed. These are connected to the drain region 13D and the source region 13S of the p-si film 13 via contact holes formed in the interlayer insulating film 15. Covering the drain electrode 16 and the source electrode 17, a planarization insulator film 18 made of SOG, BPSG or acrylate resin is formed, on which pixel electrodes 19 made of indium tin oxide (ITO) or Al are formed and are connected to the source electrode 17 via contact holes formed in the planarization insulator film 18. On the pixel electrodes 19, a vertical alignment film 31 made of polyimide or the like is formed.

Facing the TFT substrate 10, an opposing substrate 20 is disposed, and a liquid crystal layer 40 is disposed between the TFT substrate 10 and this opposing substrate 20. On the substrate 20, red (R), green (G), and blue (B) color filters 21 are formed, each of which is made of a film resist and is disposed at a position corresponding to each pixel electrode 19. On the color filters 21 a protection film 22 such as a planarization insulator film made of acrylic resin is formed. In addition, a common electrode 23 made of ITO is formed on the protection film 22. In the common electrode 23, an alignment control window 24 is formed by eliminating the ITO. As shown in FIG. 5, the alignment control window 24 extends linearly in the middle of the pixel and branches at each end in two directions, each of which bends by 45 degrees toward a corresponding corner of the pixel. On the common electrode 23 and this window 24, a vertical alignment film 32 is disposed in the same way as in the substrate 10 side.

In the present invention, the planarization insulator film 18 of the TFT substrate side and the planarization insulator film 22 of the opposing substrate side have a function for enhancing flatness of the surface as a foundation film of the pixel electrode 19 and the common electrode 23. Especially, when the liquid crystal having a negative dielectric constant anisotropy changes from the vertical alignment, good alignment change is promoted as a relative action with the electric field, i.e., an action opposing the electric field is generated. In a high resolution LCD, the roughness of the TFT or the color filter layer 31 becomes relatively large. Therefore, by reducing such step, the flatness of the interface between the alignment films 31, 32 and the liquid crystal layer 40 is enhanced, so that an uniformity of the alignment and the display quality are improved.

Furthermore, since the vertical alignment films 31 and 32 are not processed by the rubbing treatment, the pretilt angle is set within one degree, preferably at zero degree as shown in FIG. 6. In other words, the alignment vector indicating an average alignment within a minute area agrees the normal direction, or the angle therebetween is equal to or less than one degree, in the initial state. Therefore, in the voltage-applied state too, the liquid crystal molecules 41 are directed in the normal direction or within one degree from the normal direction between the display pixels.

In the above-mentioned structure, when the voltage is applied, an electric field 42 is generated between the pixel electrode 19 and the common electrode 23, so that the liquid crystal molecules tilt. At the edge portion of the pixel electrode 19, the electric field 42 is slanting from the edge of pixel electrode 19 toward the common electrode 23. Accordingly, the liquid crystal molecules 41 change their alignment so as to form the shortest slanting path from the electric field 42. In other words, not depending on the directivity given by the pretilt as in the related art, the slanting electric field tilts the alignment toward the inner side of the pixel electrode 19. As shown in FIG. 5, the alignment tilts from each of four sides of a pixel electrode 19 toward the middle of the pixel electrode 19.

Since the common electrode 23 does not exist in the alignment control window 24, the electric field is not generated, even if the voltage is applied between the pixel electrode 19 and the common electrode 23. The liquid crystal molecules 41 are fixed to the initial direction in the area of the alignment control window 24. Though the alignment controlled by the four sides of the pixel electrode 19 influences the middle portion of the pixel electrode 19 because of the continuity of the liquid crystal, the boundary between the areas in which the alignment of the liquid crystal are different is fixed on the alignment control window 24. In other words, as shown in FIG. 5, the alignment of the liquid crystal molecules are directed in four different directions in each area within the display pixel defined by the alignment control window 24, i.e., so-called pixel division is performed. Therefore, in each display pixel, areas having different transmittances are recognized as averaged, so that a constant brightness can be obtained for all viewing angles. Thus, the problem of viewing angle dependence is solved and a wide viewing angle display can be obtained.

Since the planarization insulator film 18 is used for a foundation film of the pixel electrode 19 in the present invention, the initial direction of the liquid crystal is controlled within one degree from the normal direction in high uniformity. In addition, the dignment insulator film 18 has a thickness of approximately one micrometer, so that the liquid crystal is not easily influenced by the electric field of the TFT and electrode wires (lines) 1, 2, 16, and 17 thereof disposed under the planarization insulator film 18. Therefore, as mentioned above, the pixel division is performed in excellent condition by the combination action of the slanting electric field 42 at the edge portions of the pixel electrode 19 and no electric field at the alignment control window 24.

If the width of the alignment control window 24 is increased sufficiently, a slanting electric field 42 is generated at the edge portion of the alignment control window 24, too, as shown in FIG. 6. In this case, if the alignment control window 24 has a shape as shown in FIG. 5, the tilt direction of the liquid crystal molecule 41 at the edge portion of the pixel electrode 19 and the tilt direction of the liquid crystal molecule 41 at the edge portion of the alignment control window 24 are identical, or at most differ within 45 degrees, in any area defined by a side of the pixel electrode 19 and the alignment control window 24. Accordingly, the alignment control action at the edge portion of the pixel electrode 19 is substantially the same as that at the edge portion of the alignment control window 24, and control performance can therefore be improved. In other words, in each minute area of the display pixel defined by the alignment control window 24 the orientation is controlled by the edge portion of the pixel electrode 19 as well as by the edge portion of the alignment control window 24 similarly, so that the orientation is aligned with high uniformity.

Figure 1:
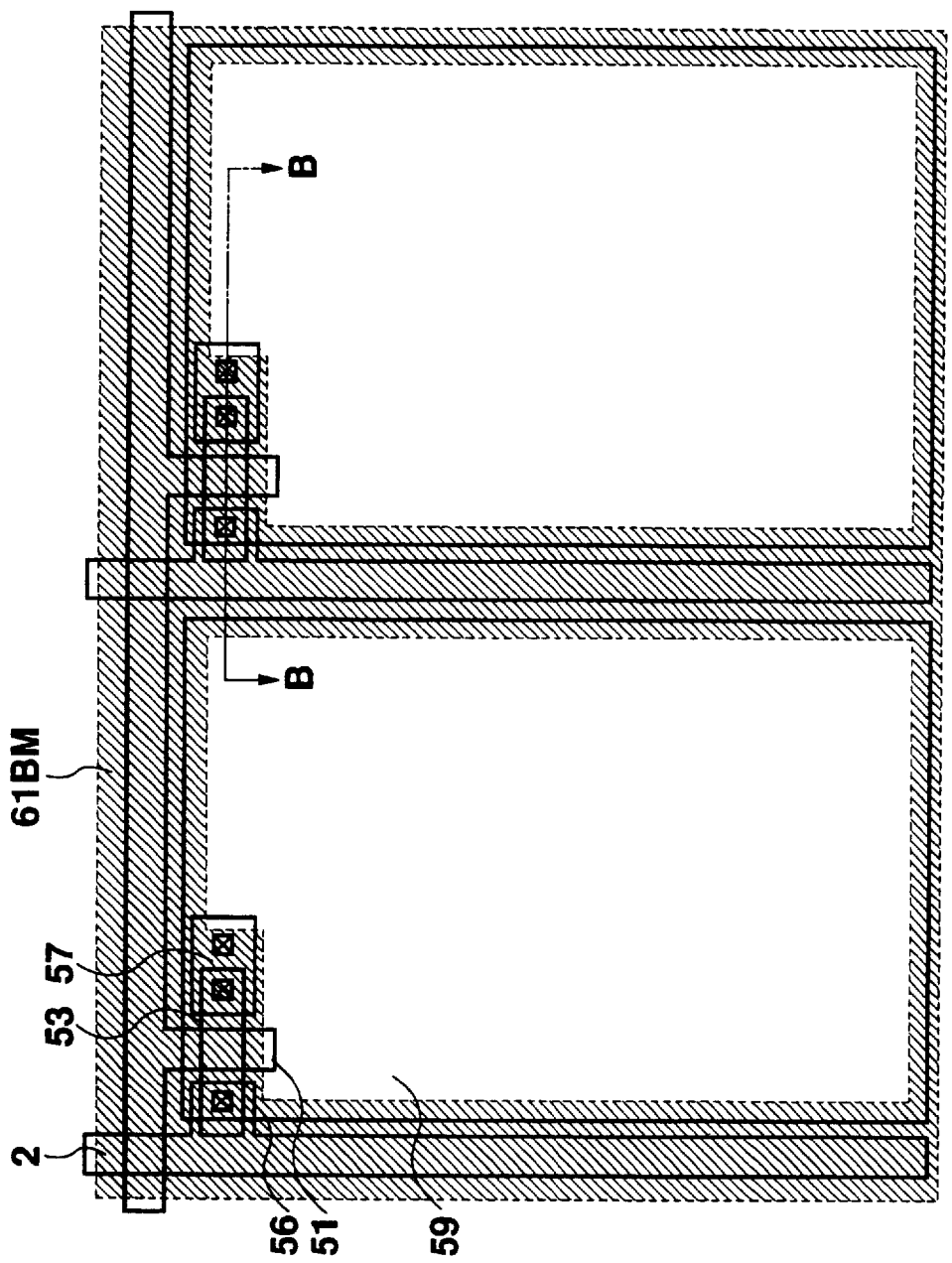
FIG. 1 is a plan view of a liquid crystal display in accordance with the related art.
Figure 2:
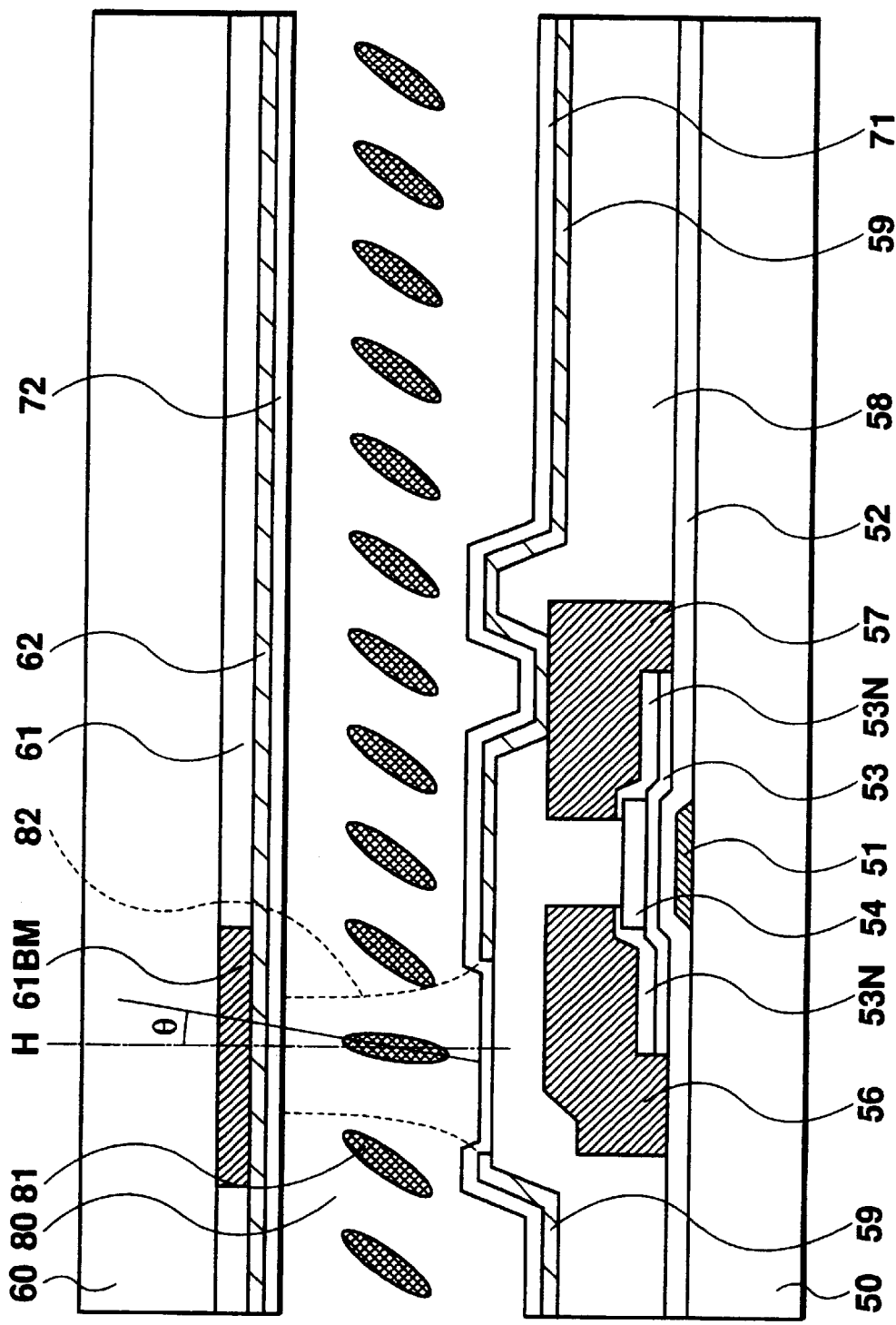
FIG. 2 is a cross section along B—B line of the liquid crystal display shown in FIG. 1.
Figure 3:
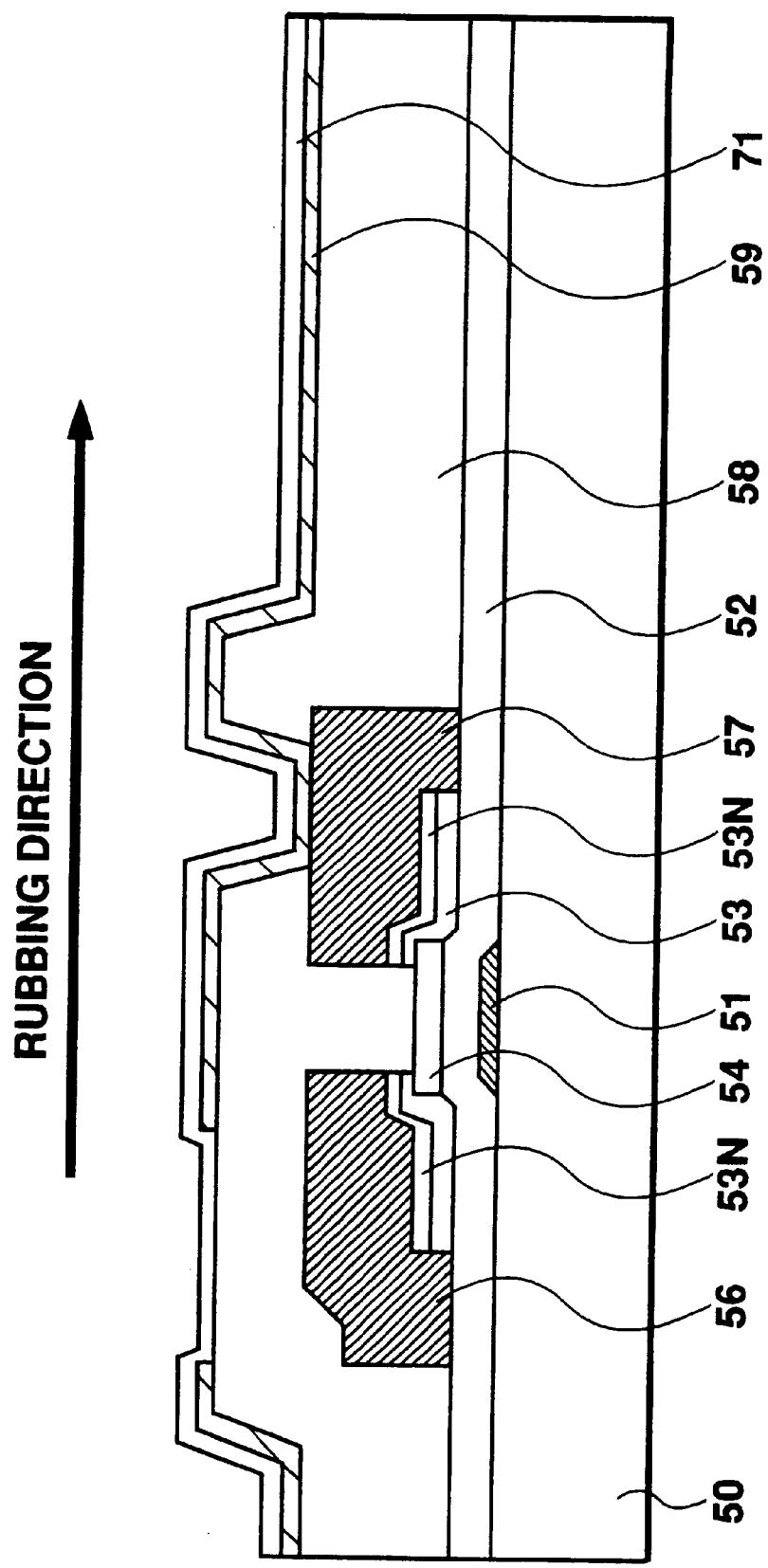
FIG. 3 is a cross section showing a manufacturing step of the liquid crystal display in accordance with the related art.
Figure 4A:
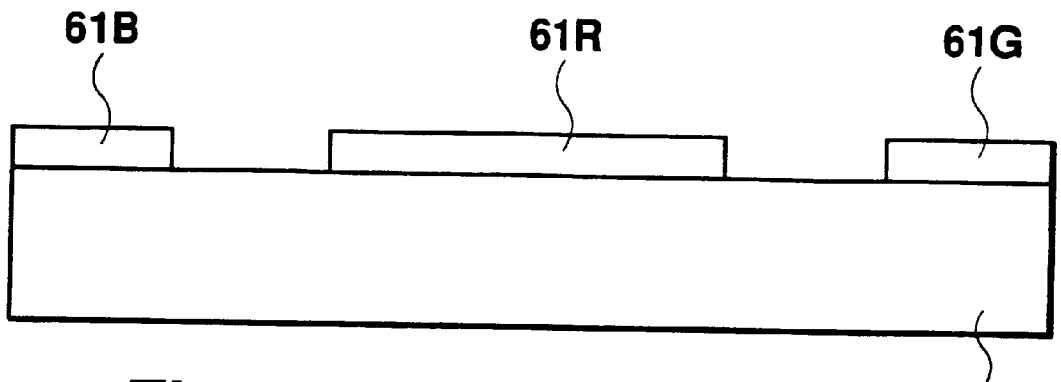
FIGS. 4A, 4B, 4C, 4D, and 4E are cross sections showing manufacturing steps of the opposing substrate of the liquid crystal display in accordance with the related art.
Figure 4B:
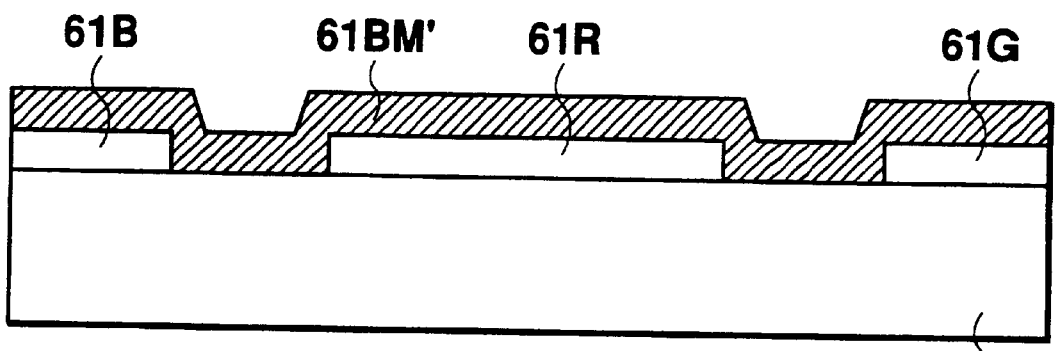
Figure 4C:
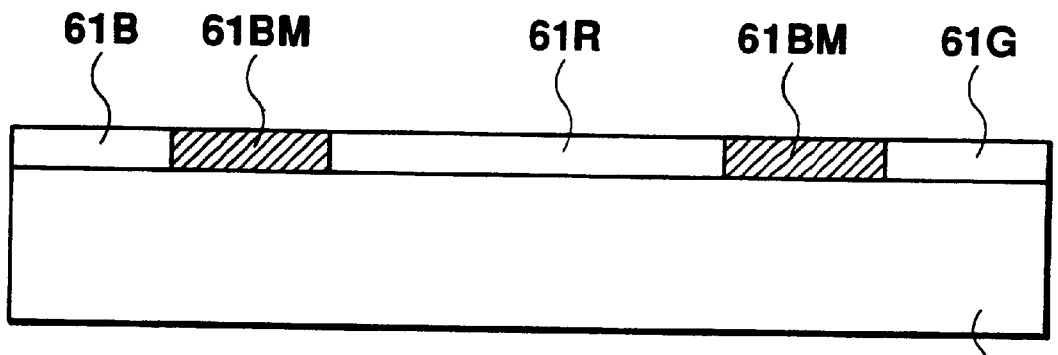
Figure 4D:
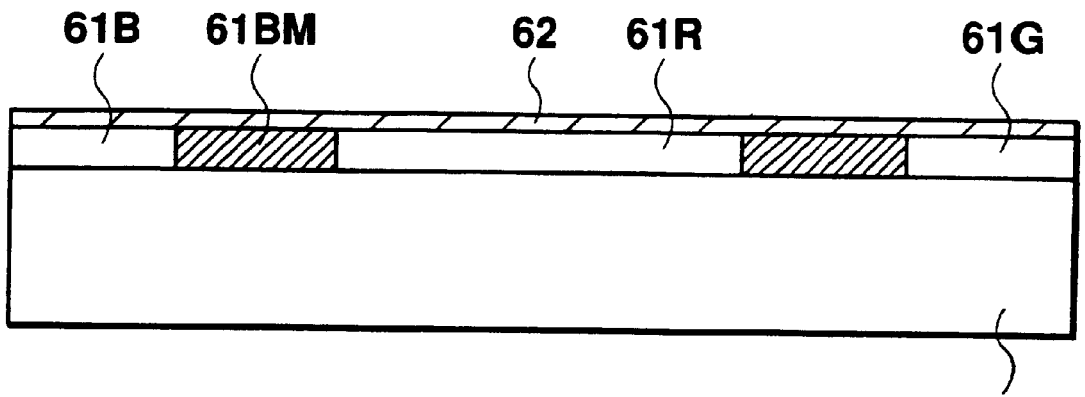
Figure 4E:
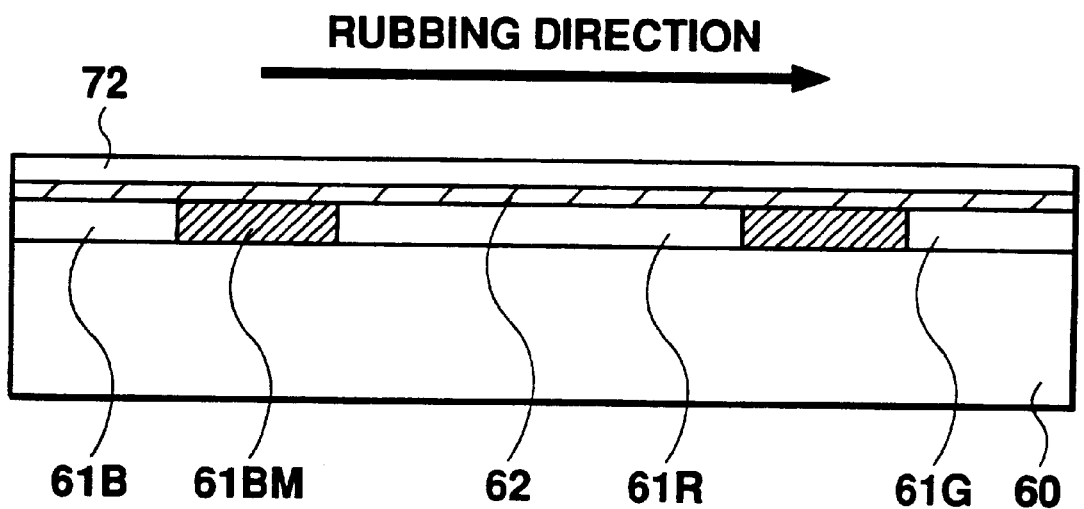

On the other hand, the opposing substrate 20 does not have the black matrix 61BM shown in FIGS. 1 and 2 because the initial direction of the liquid crystal molecule 41 is within one degree from the normal direction in the present invention, so that light leak in the area between the pixel electrodes 19 due to the pretilt given to the liquid crystal is suppressed, and the light is completely blocked without the black matrix. Therefore, it is not necessary to make the light shielding film on the opposing substrate 20 side larger in consideration of possible position shift during affixing. The effective display area is therefore prevented from decreasing, i.e., the aperture ratio is prevented from decreasing.

The TFT mentioned above uses polysilicon (p-Si) instead of amorphous silicon (a-Si) that is now typically used. This p-Si TFT has a large ON-current characteristic, so that the TFT dimensions can be reduced. Thus, the aperture ratio is improved and a high resolution can be performed. In addition, the p-Si TFT has a fast operation speed, and a peripheral circuit (driver) can be integrally formed on the substrate together with the display portions, so that an LCD with a built-in driver can be manufactured.

Figure 7:
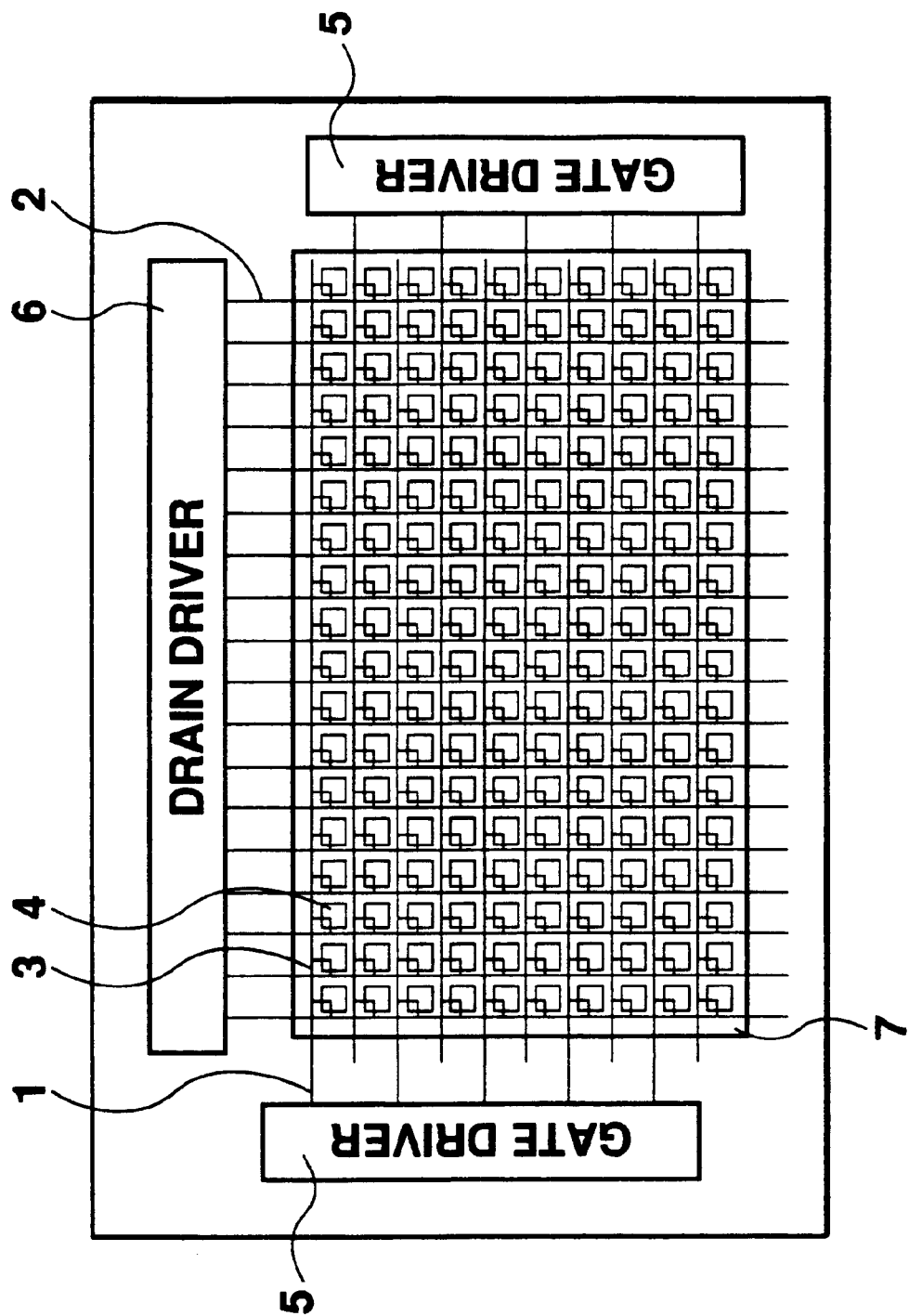
FIG. 7 illustrates a structure of the liquid crystal display in accordance with the present invention.

FIG. 7 shows an LCD with abuilt-in driver. In the middle portion gate lines 1 connected to gate electrodes 11 and drain lines 2 connected to the drain electrodes 16 are crossing each other; each cross section is provided with a TFT 3 and a pixel electrode 4 connected to the TFT 3 so as to form a display portion. On the periphery of the display portion, gate drivers 5 for supplying scanning signals to the gate lines 1 and a drain driver 6 for supplying pixel signals to the drain lines 2 are formed. The display portions, the gate drivers 5, and the drain drivers 6 are formed on a same substrate. In addition, another substrate facing the substrate via liquid crystal is provided with a common electrode 7. The common electrode 7 and the liquid crystal are defined by the pixel electrodes 4 so as to form display pixels. The peripheral driver portion is constructed with CMOS consisting of N-channel and P channel TFTs having the same structure as shown in FIG. 6, though P-channel TFT does not exist in the LD region.

FIGS. 8A–8I show a process for making the TFT substrate of the LCD in accordance with the embodiment of the present invention. First, in the step shown in FIG. 8A, a Cr film is formed on a substrate 10 by sputtering, which is etched to form a gate electrode 11.

Figure 8A:
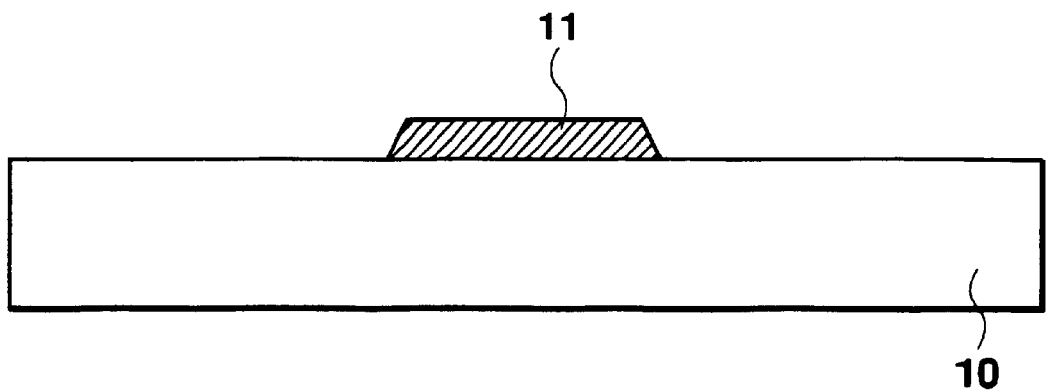
FIGS. 8A, 8B, 8C, 8D, 8E, 8F, 8G, 8H, and 8I are cross sections showing manufacturing steps of the TFT substrate of the liquid crystal display in accordance with the present invention.
Figure 8B:
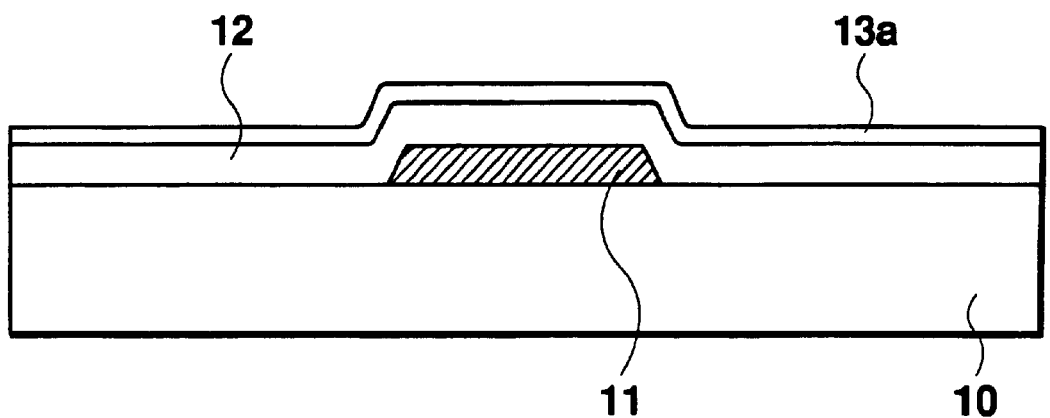

In the step shown in FIG. 8B, a gate insulating film 12 consisting of $SiN_x$ and $SiO_2$ is formed by the plasma CVD method so as to cover the entire surface including the gate electrode 11. Then, an amorphous silicon (a-Si) film 13a is formed in succession by the plasma CVD. The a-Si film 13a is formed by decomposing and depositing mono-silane $SiH_4$ or disilane $Si_2H_4$ that are material gasses with heat of approximately 400° C. and plasma.

Figure 8C:
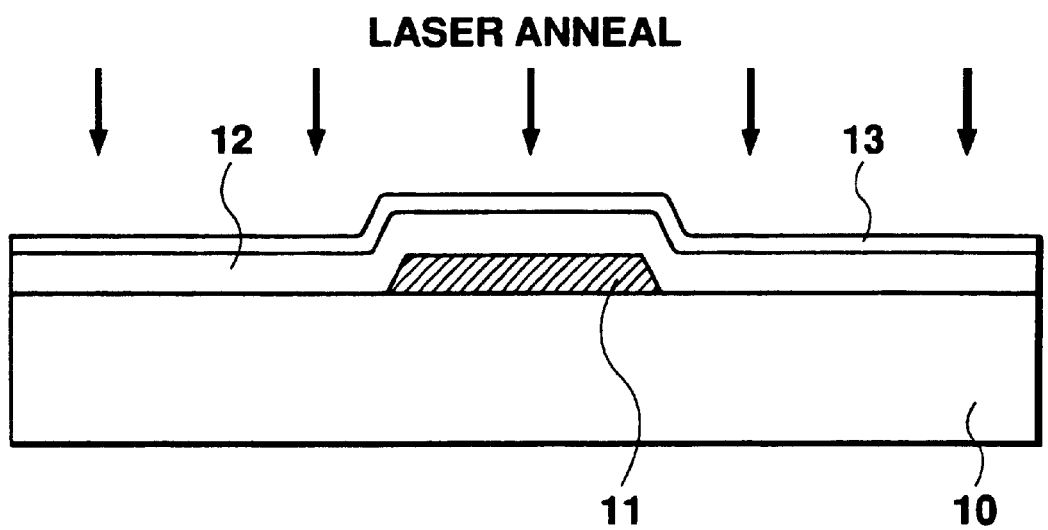

In the step shown in FIG. 8C, the a-Si film 13a is crystallized by laser annealing to form a p-Si film 13. The laser annealing is performed by line beam scanning of a pulse laser beam, for example. Since the laser annealing can be performed in relatively low temperature of the substrate below 600° C., a relatively cheap non-alkaline glass can be used for the substrate 10, so that low cost process can be attained.

Figure 8D:
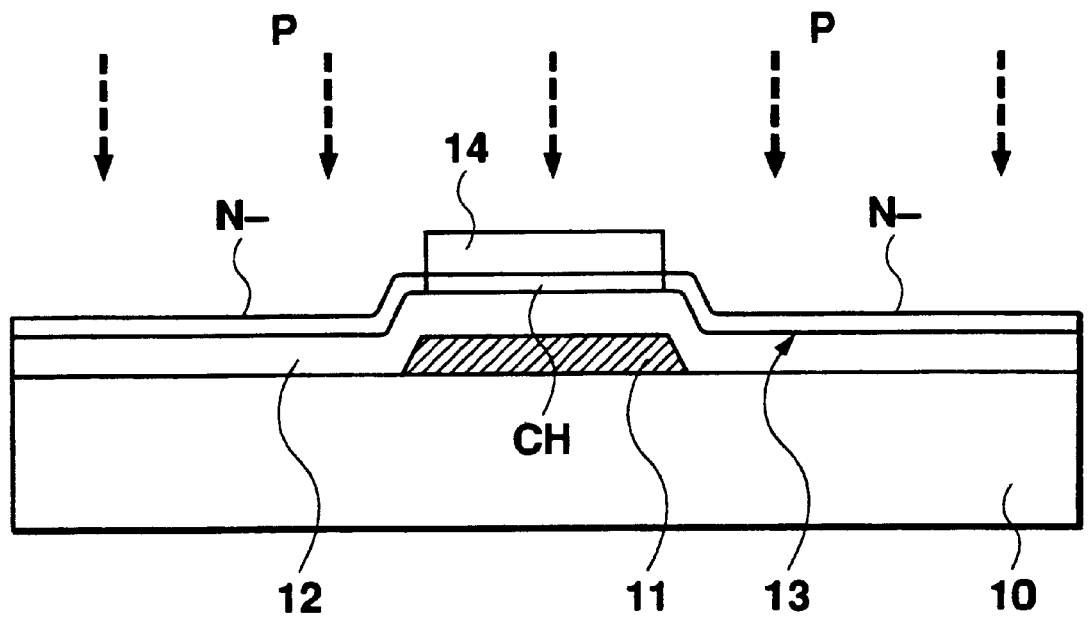

In the step shown in FIG. 8D, a $SiO_2$ film is formed on the p-Si film 13, and the $SiO_2$ film is etched by the back surface exposing so that a doping stopper 14 is formed above the gate electrode 11. In the back surface exposing step, a resist is applied onto the $SiO_2$ film, and the resist is exposed from beneath the substrate 10 utilizing the contour of the gate electrode 11, followed by developing. This doping stopper 14 is used as a mask for ion doping of phosphor (P) that indicates N-type conductivity into the p-Si film 13 at low dose extent of approximately $10^{13}$ so that the region except the doping stopper 14 forming region is doped at low concentration level ($N^-$). On this occasion, the region directly beneath the doping stopper 14, i.e., the region right above the gate electrode 11, is kept in an intrinsic semiconductor layer to be a channel region (CH) of the TFT. It is possible to leave the resist that was used for etching the doping stopper 14 during ion doping, and remove it after ion doping.

Figure 8E:
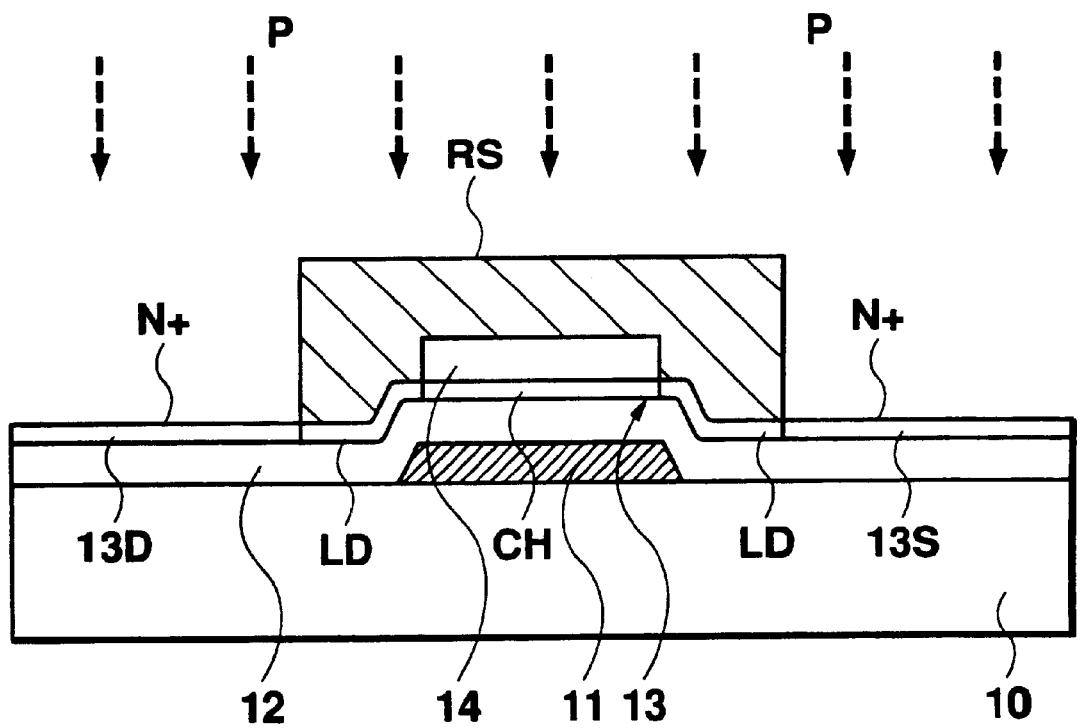

In the step shown in FIG. 8E, a resist RS that is larger than the gate electrode 11 at least in the channel length direction is formed and is used as a mask for ion doping of phosphor (P) into the p-Si film 13 at high dose extent of approximately $10^{15}$, so that the region, except for the resist RS, is doped at high concentration level ($N^+$). At this point, the low concentration region ($N^-$) and the channel region (CH) are kept in the region right below the resist RS. Thus, the LDD structure is obtained in which source and drain regions 13S and 13D are disposed at both sides of the channel region CH via the low concentration LD region.

After removing the resist RS, the p-Si film doped with the impurity ion is processed by activation annealing such as heating or laser irradiation in order to recover the crystalline of the p-Si film and to substitute the impurity for the lattice.

Figure 8F:
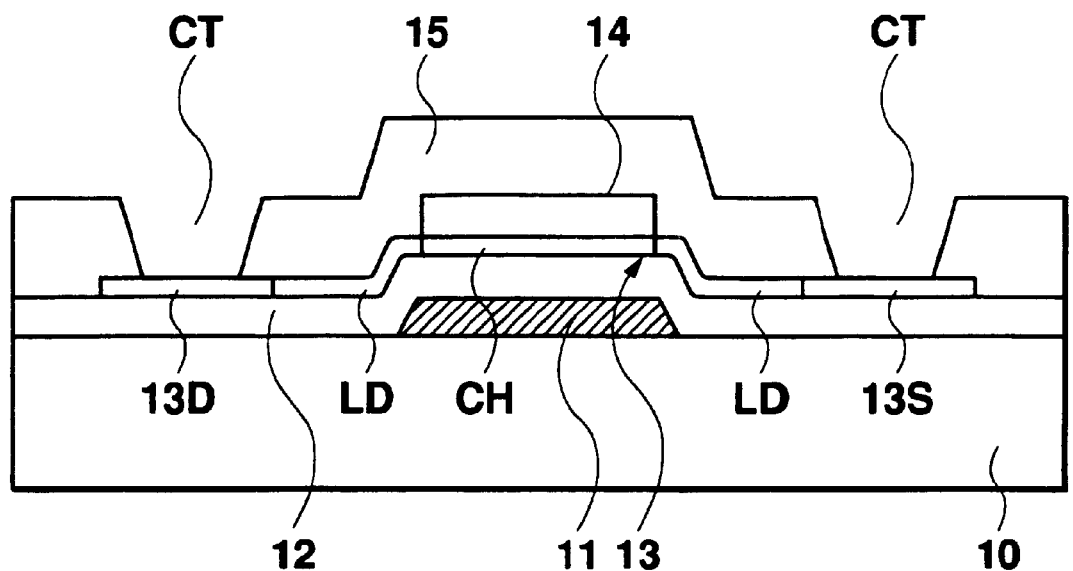

In the step shown in FIG. 8F, the p-Si film 13 is etched so as to form an island of necessary region for the TFT. Then, an interlayer insulating layer 15 is formed using $SiN_x$ and so on, in which the portions corresponding to the source and drain regions 13S and 13D are removed by etching so as to form contact holes CT, partially exposing the p-Si film 13.

Figure 8G:
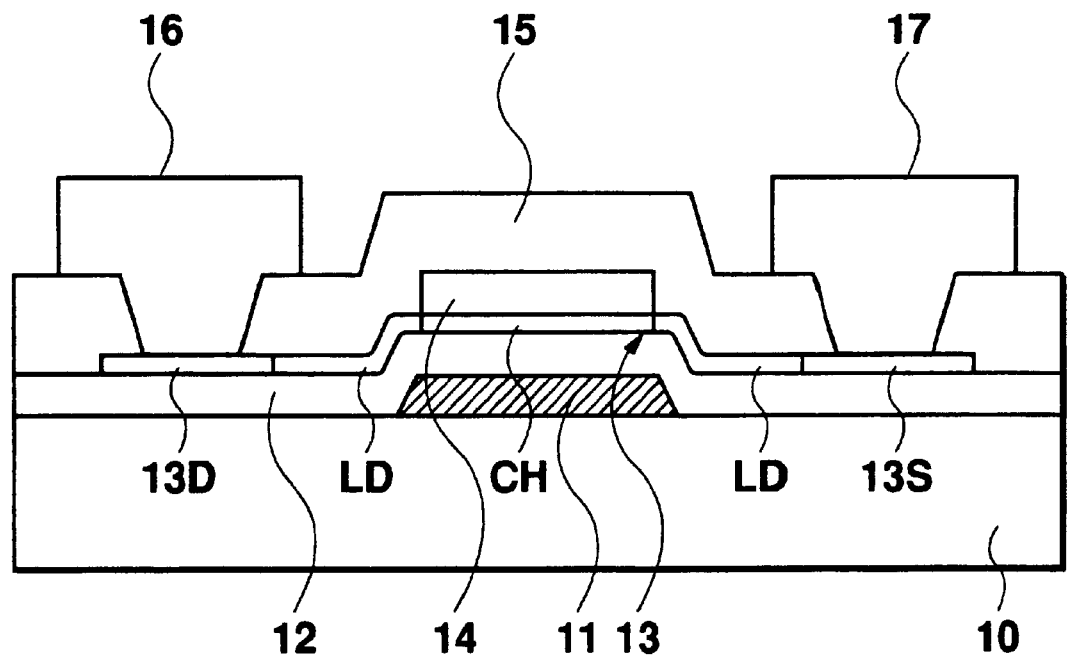

In the step shown in FIG. 8G, an Al/Mo film is formed by sputtering, which is etched to form a source electrode 17 connected to the source region 13S via the contact hole CT and a drain electrode 16 connected to the drain region 13D via the contact hole CT. The TFT is then complete.

Figure 8H:
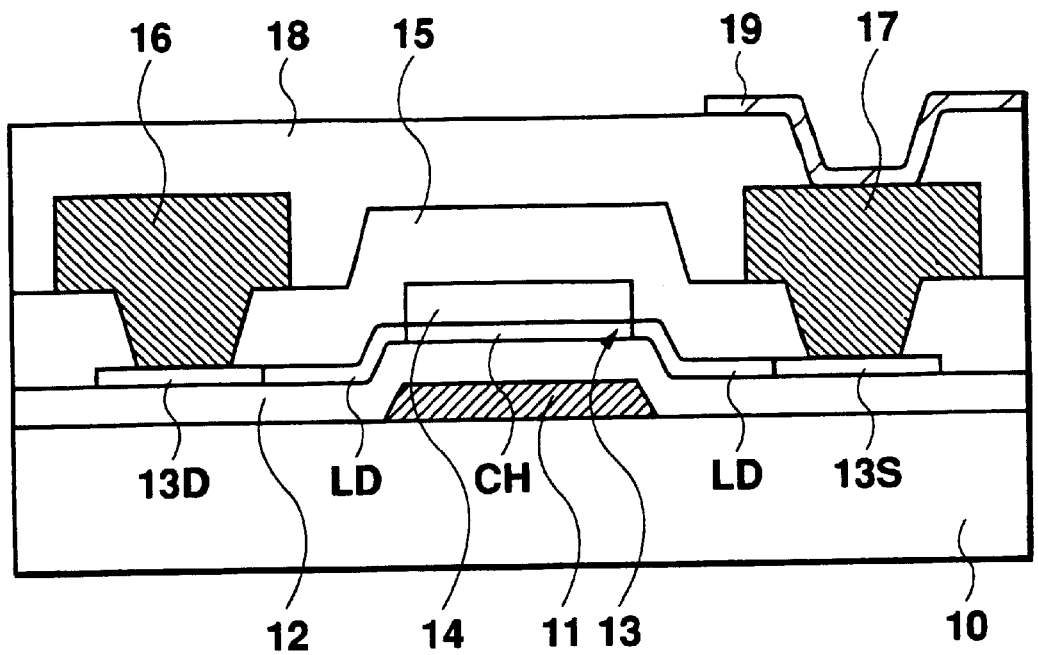

Furthermore, in the step shown in FIG. 8H, the planarization insulator film 18 made of photosensitive acrylic resin covering the TFT is formed. The planarization insulator film 18 is exposed and is developed so as to form contact holes in the display portions and to form naked upper portion of the source electrode 17. An ITO film is then formed by sputtering, which is etched to form the pixel electrode 19 that is connected to the source electrode 17.

Figure 8I:
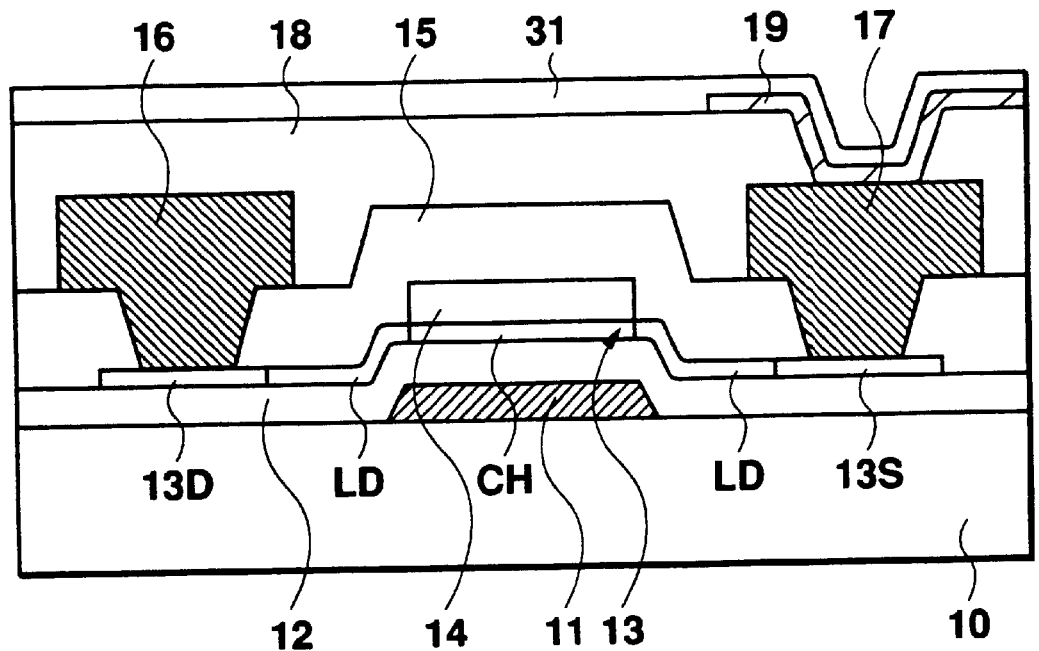

In the step shown in FIG. 8I, a liquid-like polyimide is coated by printing and is prebaked at 80° C. for 10 minutes, followed by main baking at 180° C. for 30 minutes and drying so as to form the vertical alignment film 31.

As mentioned above, the TFT substrate is manufactured.

Next, the method for manufacturing the opposing substrate will be explained with reference to FIGS. 9A–9D. First, in the step shown in FIG. 9A, red (R), green (G), and blue (B) color filters 21R, 21G, and 21B are formed on the substrate 20. In order to form the R color filter 21R, a photosensitive R film resist is affixed, which is then exposed and developed in the shape corresponding to the R display pixels. In the same way, the G color filter 21G and the B color filter 21B are formed, too. These color filters 21R, 21G and 21B are formed in dimensions larger than at least corresponding pixel electrode 19.

Figure 9A:
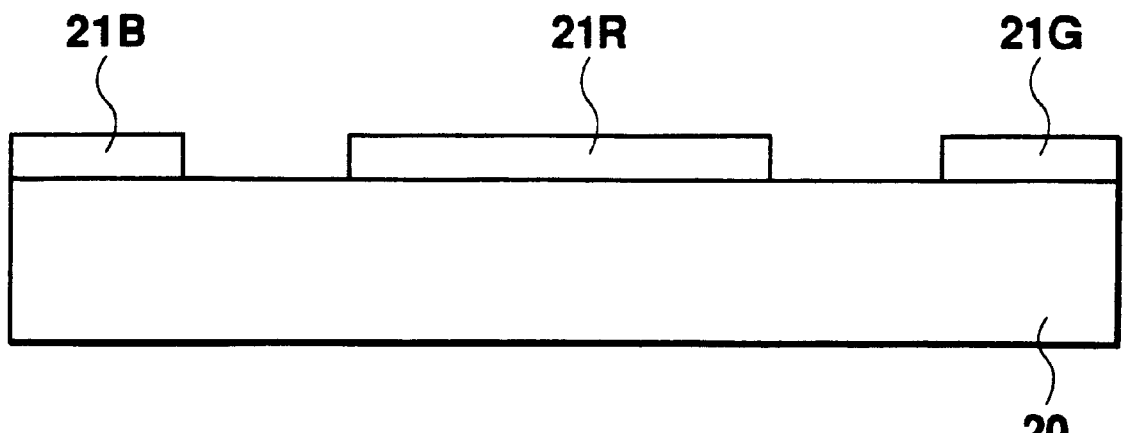
FIGS. 9A, 9B, 9C, and 9D are cross sections showing manufacturing steps of the opposing substrate of the liquid crystal display in accordance with the present invention.
Figure 9B:
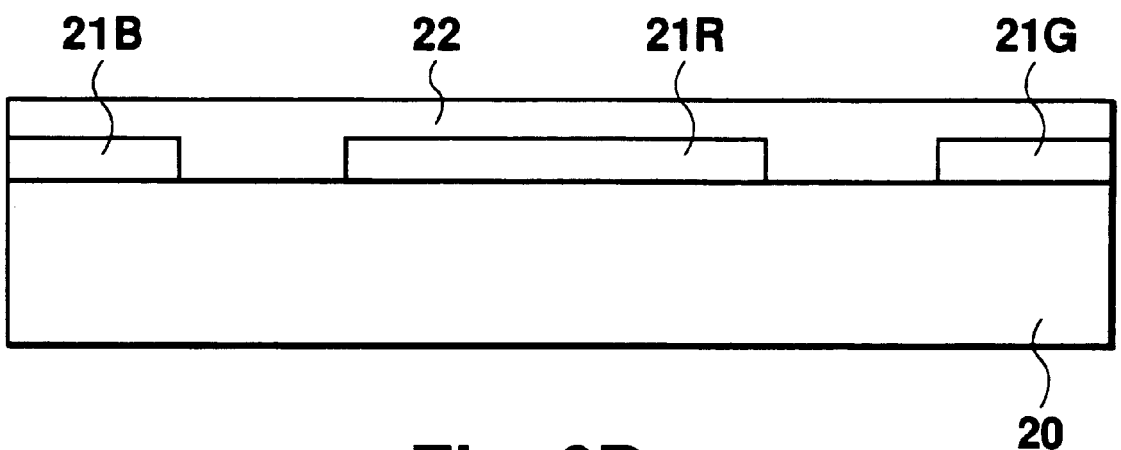

In the step shown in FIG. 9B, an acrylic resin film is formed to cover the color filters 21R, 21G, and 21B, so as to form protection film 22 of the color filters 21R, 21G, and 21B. This protection film 22 also works as a planarization film for a foundation of the common electrode 23.

Figure 9C:
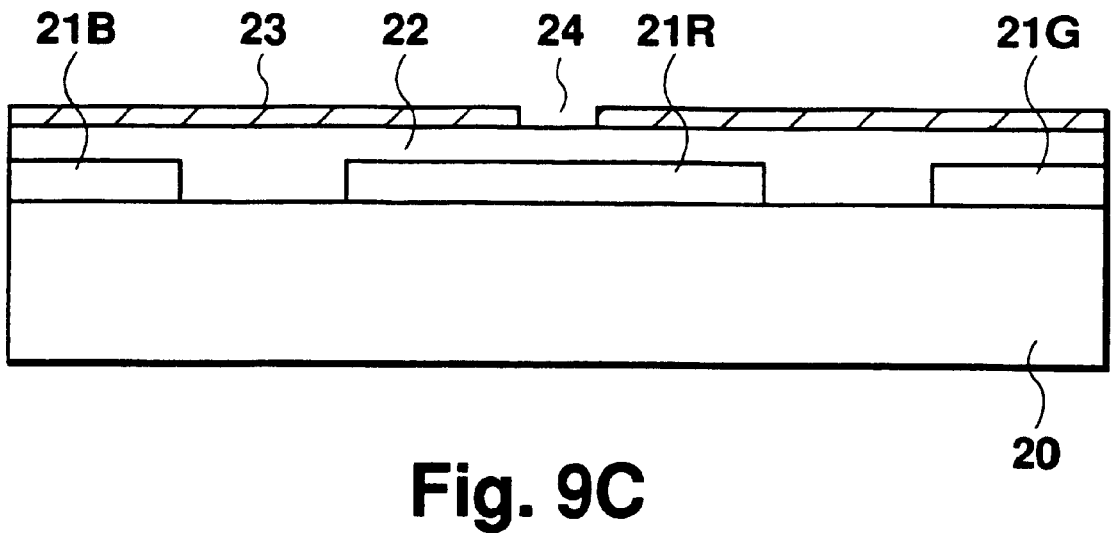

In the step shown in FIG. 9C, an ITO film is formed by sputtering, which is etched to form the common electrode 23 and the alignment control window 24 in the common electrode 23.

Figure 9D:
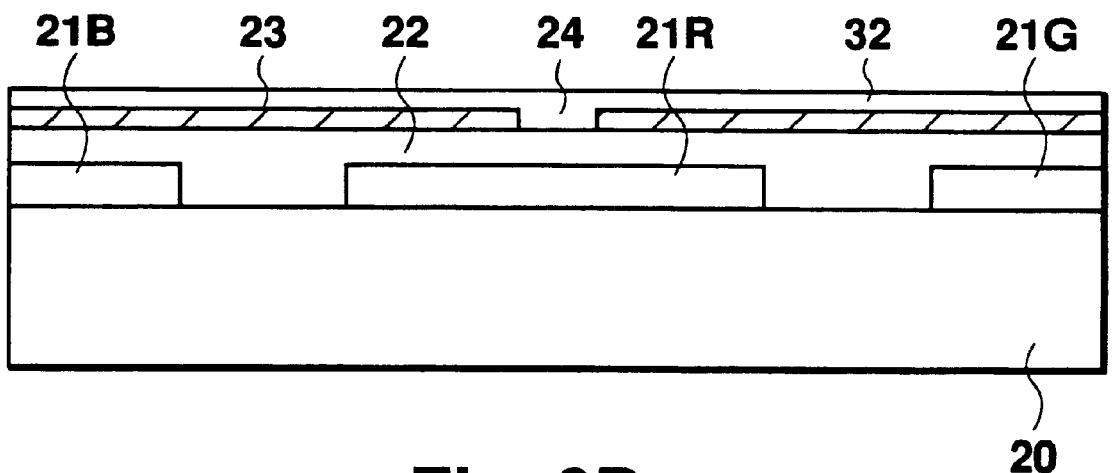

In the step shown in FIG. 9D, a liquid-like polyimide is coated by printing and is prebaked at 80° C. for 10 minutes, followed by main baking at 180° C. for 30 minutes and drying so as to form the vertical alignment film 32.

As described above, an opposing substrate is manufactured.

In the present invention, the rubbing treatment is not performed in the step for forming the vertical alignment film 31 of the TFT substrate 10 as shown in FIG. 8I and in the step for forming the alignment film 32 of the opposing substrate 20 as shown in FIG. 9D. Therefore, the initial direction of the liquid crystal does not have the pretilt, and is within one degree from the normal direction. Particularly, since the rubbing treatment is not performed on the TFT substrate, TFT breakdown is prevented. In the LCD with built-in drivers, many more TFTs are concentrated in the driver portions 5, 6 as compared with the display portions. If only one of the TFTs breaks down, a defective display occurs. However, since the rubbing treatment is not performed in the present invention, such problem does not occur and yield in production is improved.

Furthermore, in the step of manufacturing the opposing substrate 20 as shown in FIG. 9A, a black matrix is not formed after forming the color filters 21R, 21G and 21B. Instead, by combination of the liquid crystal and the polarizing film, light shielding is performed. Since there is no black matrix, the effective display area and the aperture ratio increases.

What is claimed is:

1. A liquid crystal display, comprising first and second substrates, each of which having an opposing surface with an electrode for driving liquid crystal and an alignment film, the liquid crystal disposed between the first and the second substrates, wherein the alignment film is a rubbing-less alignment film for controlling the alignment of the liquid crystal, a planarization insulating film having a planar surface is formed to help control the initial alignment of liquid crystal molecules in a predetermined direction with respect to the substrates, alignment direction of the liquid crystal molecules is controlled by a slanting electric field generated by said electrode formed on each of said first and second substrates at a surface opposing to said liquid crystal such that the liquid crystal molecules are oriented in a plurality of directions within one pixel, said planarization insulating film having a planar upper surface is formed on at least the lower side of the electrode of said first substrate so as to cover the entire surface of the first substrate facing the liquid crystal, the electrode of the first substrate is formed on the planar upper surface of said planarization insulating film, and the rubbing-less alignment film is formed on said electrode of the first substrate.

2. The liquid crystal display according to claim 1, wherein the surface of the second substrate facing the liquid crystal is provided with a color filter layer, and a common electrode is formed on the color filter layer, substantially the entire surface of the common electrode being planarized.

3. The liquid crystal display according to claim 1, wherein said planarization insulating film is composed of SOG, BPSG, or resin.

4. The liquid crystal display according to claim 1, wherein an inter-layer insulating film is further provided on the lower side of said planarization insulating film.

5. The liquid crystal display according to claim 1, wherein said liquid crystal has negative dielectric constant anisotropy.

6. The liquid crystal display according to claim 1, wherein the initial alignment of the liquid crystal is in a normal direction of the substrates.

7. A liquid crystal display, comprising first and second substrates, each of which having an opposing surface with an alignment film of liquid crystal, the liquid crystal disposed between the first and the second substrates, wherein the alignment film is a rubbing-less alignment film for controlling the alignment of the liquid crystal, a planarization insulating film having a planar surface is formed to help control the initial alignment of liquid crystal molecules in a predetermined direction with respect to the substrates, alignment direction of the liquid crystal molecules is controlled by an electric field generated by said electrode formed on said first and/or second substrates at a surface opposing to said liquid crystal such that the liquid crystal molecules are oriented in a plurality of directions within one pixel, said planarization insulating film having a planar upper surface is formed to cover the entire surface of the first substrate facing the liquid crystal, and the rubbing-less alignment film formed on the first substrate is disposed on the upper side of said planar upper surface of the planarization insulating film.

8. The liquid crystal display according to claim 7, wherein said planarization insulating film is composed of SOG, BPSG, or resin.

9. The liquid crystal display according to claim 7, wherein an inter-layer insulating film is further provided on the lower side of said planarization insulating film.

10. A liquid crystal display that includes first and second substrates facing each other and liquid crystal disposed between the first and second substrates, said liquid crystal display comprising:

at least one thin film transistor formed on the first substrate and at least one electrode wire for supplying signals to the thin film transistor;

a planarization insulating film formed to cover upper portions of the thin film transistor and the electrode wire;

for each pixel, at least one pixel electrode for driving the liquid crystal, said pixel electrode being formed on a planar surface of the planarization insulating film, having the entire surface facing the liquid crystal substantially planarized, and connected to the corresponding thin film transistor via a contact hole; and a rubbing-less vertical alignment film formed to cover the pixel electrode, wherein a common electrode for driving the liquid crystal, an alignment divider formed on a position on the common electrode facing the pixel electrode, and a rubbing-less vertical alignment film formed to cover the common electrode are provided on the second substrate opposing the first substrate, the liquid crystal has a negative dielectric constant anisotropy, and the initial alignment direction of liquid crystal molecules is controlled by a slanting electric field generated by the common electrode, the alignment divider, and the pixel electrode.

11. The liquid crystal display according to claim 10, wherein the liquid crystal molecules are oriented in a plurality of directions at both sides of said alignment divider.

12. The liquid crystal display according to claim 10, wherein the surface of the second substrate facing the liquid crystal is provided with a color filter layer, and a common electrode is formed on the color filter layer, substantially the entire surface of the common electrode being planarized.

13. The liquid crystal display according to claim 10, wherein the thin film transistor uses polycrystal semiconductor layer as an activation layer.

14. The liquid crystal display according to claim 10, wherein said planarization insulating film is composed of SOG, BPSG, or resin.

15. The liquid crystal display according to claim 10, wherein an inter-layer insulating film is further provided on the lower side of said planarization insulating film.

* * * * *